United States Patent [19]
Taboada et al.

[11] Patent Number: 5,898,809
[45] Date of Patent: Apr. 27, 1999

[54] PROJECTING A SHEET OF LASER LIGHT SUCH AS A LASER REFERENCE PLANE USING A FIBER OPTIC BUNDLE

[76] Inventors: John Taboada; John Martin Taboada, both of 12530 Elm Country, San Antonio, Tex. 78230

[21] Appl. No.: 08/934,154

[22] Filed: Sep. 19, 1997

[51] Int. Cl.⁶ .................................................. G02B 6/04
[52] U.S. Cl. ...................... 385/115; 385/116; 385/120; 385/901
[58] Field of Search ..................... 385/115, 116, 385/119, 120, 121, 147, 901, 12, 13, 31, 33, 38, 39; 372/15, 16, 99

[56] References Cited

U.S. PATENT DOCUMENTS

| | | | |
|---|---|---|---|
| 5,652,810 | 7/1997 | Tipton et al. | 385/12 |
| 5,708,747 | 1/1998 | Danckwerth | 385/115 |
| 5,708,748 | 1/1998 | Ohtomo et al. | 385/120 |

*Primary Examiner*—Phan T. H. Palmer
*Attorney, Agent, or Firm*—Andrew Viger

[57] ABSTRACT

A sheet-of-light projection system is projects a substantially uniform sheet of laser light (or other electromagnetic radiation) using a fiber-optic bundle. Incidence optics directs a laser beam to be incident to the fiber-optic bundle at a predetermined angle of incidence, resulting in the projection of a sheet of light. For the exemplary embodiment, the angle of incidence is substantially orthogonal to the fiber-optic bundle, resulting in the projection of a substantially planar sheet of light. Thus, the laser projection technique converts a beam of laser light (or other electromagnetic radiation such as UV, visible, IR or microwave radiation) into a radially extending sheet of light that in the exemplary embodiment is substantially planar. In one application, the laser projection technique can be used in the construction industry to project a uniform substantially planar sheet of light for use as a reference marker.

29 Claims, 6 Drawing Sheets

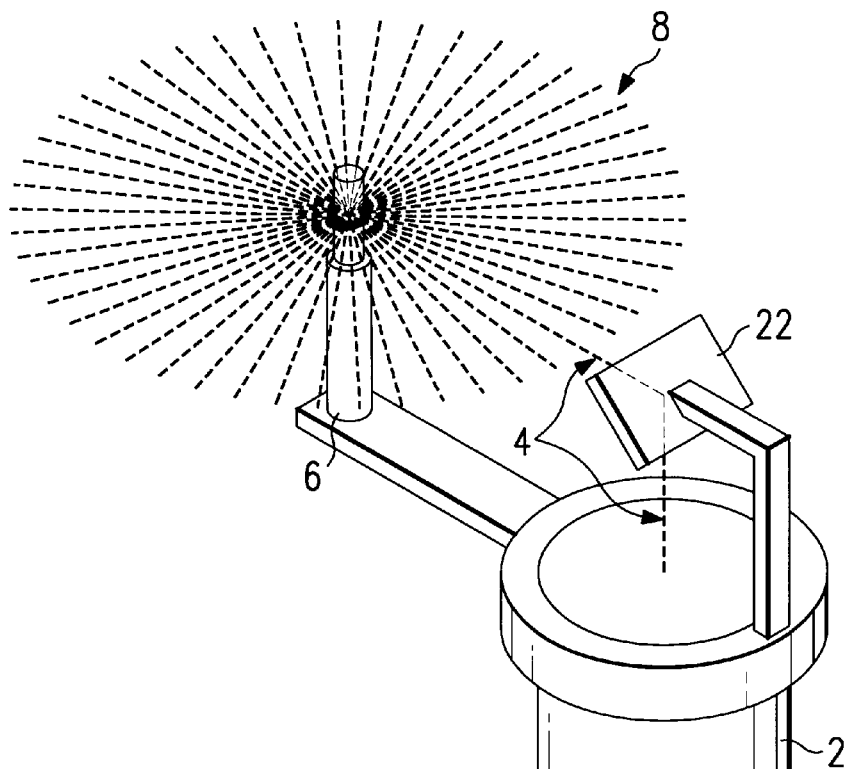
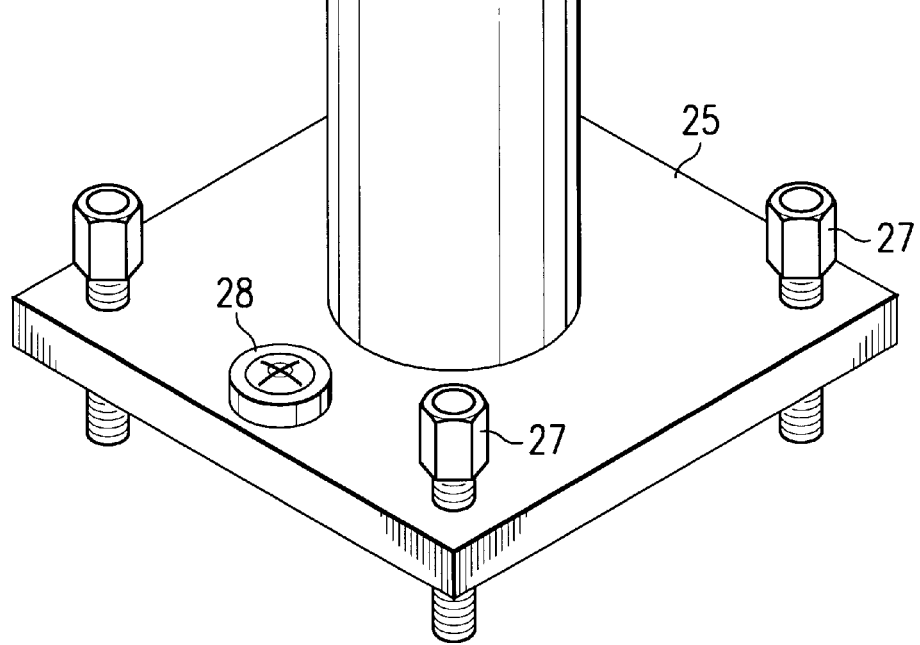
FIG. 6

PROJECTING A SHEET OF LASER LIGHT SUCH AS A LASER REFERENCE PLANE USING A FIBER OPTIC BUNDLE

BACKGROUND

1. Technical Field

The invention relates generally to systems for projecting laser light (or other electromagnetic radiation), and more particularly relates to systems for projecting a sheet of laser light. In even greater particularity, the invention relates to projecting a laser reference plane.

In one aspect of the invention, a laser beam is converted into a radially extending, omnidirectional substantially planar sheet of laser light for use as a reference plane for construction projects.

2. Related Art

Converting a laser beam into an omnidirectional sheet of laser light has a number of useful applications. For example, a substantially planar sheet of laser light can be used as a reference plane or marker, such as in the construction industry.

Without limiting the scope of the invention, this background information is provided in the context of a specific problem to which the invention has application: projecting a laser reference plane with a minimum of moving parts and critical adjustments.

Current techniques for converting a laser beam into a reference plane include:

(a) using a curved lens, (b) using a rotating prism/mirror/laser, and (c) using a stationary reflecting cone.

FIG. 1a, 1b, and 1c illustrate the curved lens approach with three different lens geometries. The laser beam is incident to a cylindrical lens with a typical curvature of about 1 mm radius. The lens projects a fan of laser light (an effect described by geometrical optics). Taboada et.al., Rev. Sci. Instruments (Vol. 44, No. 9. September 1973, p. 1240) describes using a cylindrical lens to generate the reference plane. A disadvantage of the cylindrical lens approach is that the light plane is limited to about 90 degrees of subtense, which has limited utility for many reference plane applications (such as in the construction industry).

FIG. 2 illustrates the rotating prism/mirror approach which is described further in U.S. Pat. Nos. 3,588,249 (Studebaker), 4,062,634 (Rando), and 4,830,489 (Cain). A plane of light is projected radially outward from a prism or mirror which is rotated continuously through 360 degrees to sweep out the given reference plane. A variation of this approach is to use a rotating laser such as described in U.S. Pat. Nos. 5,576,826 and 5,307,368 (Hamar). A number of disadvantages of the rotating prism/mirror/laser approach results from the requirement of rotational mechanical movement, including control for vibration, gyroscopic force, and alignment, as well as precision bearings and special housing.

FIG. 3 illustrates the reflecting cone approach, which is described further in U.S. Pat. 4,111,564 (Trice). A laser beam, preferably one that is in the TEM01 mode which is characterized by a donut shaped transverse light distribution, is incident along the axis of a reflecting cone. The projected light defines a reference plane. Disadvantages of the reflecting cone approach include the requirement of a precisely defined input circular beam (TEM00 or TEM01), and limitations due to relatively stringent alignment demands (even a change of 1 arc second in the incident angle of the laser beam can cause an objectionable change in the light plane to an umbrella-like distribution. These alignment demands are addressed in U.S. Pat. No. 5,335,244 (Dugan), which still requires alignment adjustments and additional optical components to achieve the desired performance.

SUMMARY

An object of the invention is to project a sheet of electromagnetic radiation (such as laser light) collimated in a thin plane without using moving parts or delicate alignment components. A more specific object of the invention is to project a laser reference plane aligned to be substantially planar with a high degree of accuracy.

These and other objects of the invention are achieved by a sheet-of-radiation projection system that projects a substantially uniform sheet of electromagnetic radiation from a source of a beam of electromagnetic radiation (such as a beam of laser light). The projection system includes (a) a bundle of substantially parallel dielectric waveguides, and (b) incidence optics. The incidence optics directs the beam to be incident to the bundle of dielectric waveguides at a predetermined angle incidence, such that a sheet of radiation is projected from the bundle of dielectric waveguides.

In an exemplary embodiment, a solid state laser beam with elliptical light distribution is aligned to the axis of a fiber optic bundle, with the axis of the ellipse preferably aligned transverse to the axis of the fiber optic bundle. The laser beam is reflected by incidence optics to the fiber bundle with substantially perpendicular incidence, such that the projected sheet of radiation is substantially planar. The beam dimensions are kept within the subtense of the fiber optic bundle. The subtense of the incidence optics (mirror, prism, etc.) is minimized to reduce the associated gap in the laser reference plane.

Embodiments of the invention may be implemented to realize one or more of the following technical advantages of the invention. The laser projection technique converts a beam of laser light (or other electromagnetic radiation such as UV, visible, IR or microwave radiation) into a radially extending sheet of light that in the exemplary embodiment is substantially planar. The laser sheet is projected by the localization or quasi-localization of the light emitted transverse to the optical axis of a fiber optic bundle. The laser projection system can be economically manufactured to alleviate manufacturing and operational requirements. In one application, the laser projection technique can be used in the construction industry to project a uniform substantially planar sheet of light for use as a reference marker.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

BRIEF DESCRIPTION OF THE DRAWINGS

FIG. 6 illustrates the exemplary embodiment of a laser plane projection system according to the invention, with the laser beam being aligned with the long axis of a fiber optic bundle, and then reflected by incidence optics to the fiber bundle with substantially perpendicular incidence—the subtense of the incidence optics is minimized to minimize the associated gap in the laser reference plane.

FIG. 10 illustrates an alternative implementation of a laser plane projection system, in which three mutually orthogonal planes of light are generated.

DETAILED DESCRIPTION

The detailed description of an exemplary embodiment of the sheet-of-light projection system, is organized as follows:
1. Laser Plane Projection
    1.1. Fiber Optic Bundle
    1.2. Localization of Light Effect
    1.3. Exemplary Projection System
2. Alternative Implementations
3. Conclusion This organizational outline, and the corresponding headings, are used in this Detailed Description for convenience of reference only.

This Detailed Description describes an exemplary embodiment of the sheet-of-light projection system used to convert a laser beam into a projected sheet of laser light that is substantially planar (such as for use as a laser reference plane). The term "sheet of light" is used to refer to a sheet of any form of collimated electromagnetic radiation (i.e., a "sheet of radiation"), including visible laser light, but also including non-visible electromagnetic radiation (such as UV, infrared, and millimeter wave)—the "sheet" extends outward from a point, typically subtending an angle of 360 degrees, although a lesser angle of subtense may be projected if appropriate for the particular application or optical projection system (such as a laser or maser). In addition, the "sheet" need not be planar, but may be curved if appropriate for the particular application. The term "omnidirectional" means substantially uniform.

1. Laser Plane Projection

The exemplary laser plane projection system involves directing a laser beam substantially orthogonal to a fiber-optic bundle, i.e., a fused bundle of individual fiber optic filaments. The incident laser light is projected radially outward from the fiber optic bundle forming an omnidirectional, substantially planar sheet of laser light or laser plane.

Figures 1A, 1B, 1C, 2, 3:
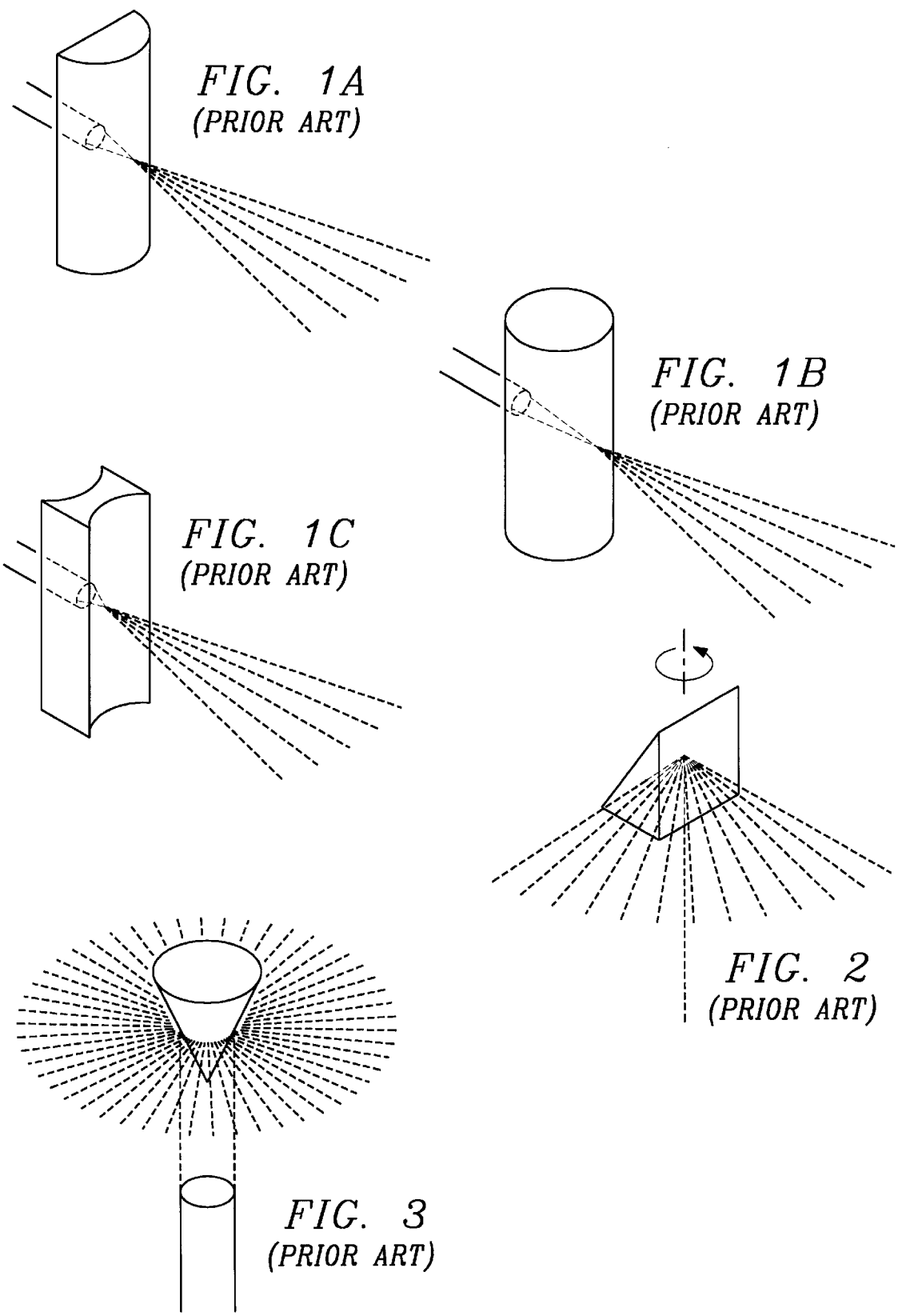
FIGS. 1a, 1b, and 1c illustrates the prior art curved lens approach to projecting a laser plane
FIG. 2 illustrates the rotating prism/mirror approach to projecting laser plane.
FIG. 3 illustrates the reflecting cone approach to projecting a laser plane.
Figure 4A:
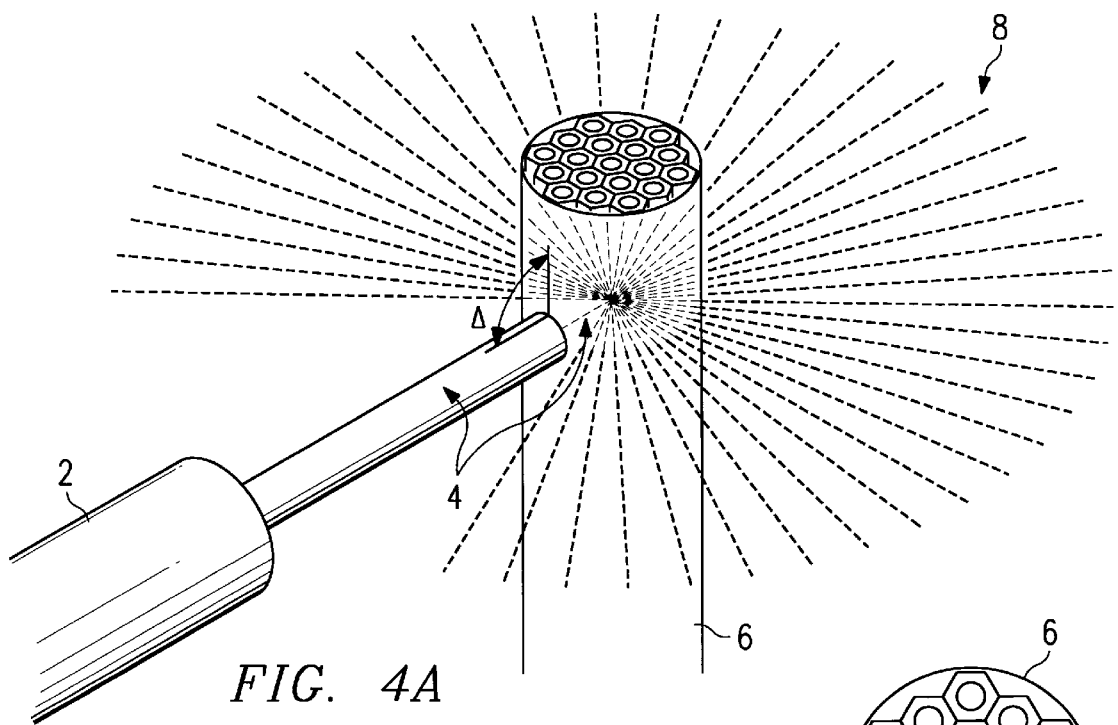
FIGS. 4a and 4b illustrate projecting a laser plane according to the invention using a laser beam incident substantially perpendicular to a fused fiber optic bundle (shown cross-sectionally in 4b).

FIG. 4a illustrates the laser plane projection technique, projecting a laser plane according to the invention using a laser beam incident substantially orthogonal to a fiber-optic bundle.

A laser beam source 2 directs beam 4 to a fiber-optic bundle 6 such that the incident angle is substantially 90 degrees. The incident laser beam is isotropically scattered radially through 360 degrees to project a substantially planar isotropic sheet of light 8.

Alternatively, beam source 2 may be another source of collimated light, or another source of collimated electromagnetic radiation such as a maser or other form of microwave beam emitter.

1.1. Fiber Optic Bundle

The exemplary fiber optic bundle 6 is of conventional manufacture and configuration. The bundle is formed by fused individual fibers of stepped or gradient index, well known in the art.

Figure 4B:
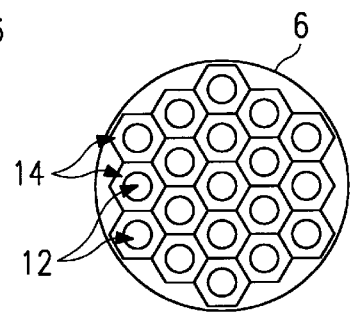

FIG. 4b illustrates an enlarged cross-sectional view of a portion of the exemplary fiber-optic bundle 6, with the individual fibers exhibiting an hexagonal closed packed geometry resulting from the fusing and drawing process of conventional fiber bundle manufacturing. After fusing, the bundle is composed of a quasi-periodic distribution of high index cores 12 embedded in a ground media of lower index 14 (or visa versa) (i.e., the conventional $N_1/N_2$ stepped index fiber optic waveguide configuration).

The spatial density of the fiber elements in the bundle is selected to create a favorable condition for the desired wavelength. That is, the bundle element packing density should be greater for the blue end of the spectrum as opposed to the red portion of the spectrum.

For the exemplary embodiment, a recommended fiber optic bundle is approximately 3 to 5 mm in diameter and the individual fiber cells (hexagonally close packed) are approximately 40 microns in diameter and the inter cell spacings is of the order of 10 microns. The mean free path of the fluctuations in index along any path is of the order of a few microns which should enhance the likelihood of yielding continued and planar isotropic scatter of the input light into the projected 360 degree planar isotropic sheet of light. These dimensions are exemplary only—selection of appropriate fiber optic bundle configuration will depend upon the wavelength of the incident laser beam.

Alternatively, any closely packed bundle of cylindrical dielectric waveguides may be used in place of the exemplary fused fiber optic bundle. For example, a non-fused closely packed bundle of fiber-optic light guides or closely packed bundle of thin dielectric rods with radially varying dielectric constant for visible or microwave radiation, respectively, could be used.

Referring to FIG. 4a, alignment of the laser beam 4 to achieve the required degree of orthogonality is accomplished by locating the incident beam within the boundary of the width of fiber-optic bundle 6. This is facilitated by making the diameter of the laser beam 4 smaller than the diameter of the fiber-optic bundle 6—for the exemplary embodiment the diameter of laser beam 4 is about one millimeter, while the diameter of the fiber bundle is about 3 mm. The thickness of the projected sheet will approximate the diameter of the incident laser beam—lenses can be conventionally used to collimate the laser beam to within the desired diameter.

As the incident laser beam diverts from orthogonality, the resulting light scatter exhibits an increasing curvature (an "umbrella" effect).

1.2. Localization of Light Effect

Propagating the laser beam substantially orthogonal to the fibers within the fiber optic bundle causes the projection of a thin, substantially planar sheet of radiation—the sheet of radiation projects from the bundle substantially perpendicular to the axis of the fiber optic bundle and with substantially omnidirectional (within the plane), uniform intensity distribution.

This effect is believed to be a manifestation of a process known as localization of light, such as described in Sajeev John, "Localization of light", Physics Today, Vol. 44, No. 5, p32–40 (1991). Essentially, if the conditions are such that the spatial periodicity of the index variations due to repeated elements found within transparent dielectric structures is of the order of the wavelength of the incident laser beam and the radiation beam is caused to propagate in this medium, then some of the light is trapped in localized states that in principle produce laser like re-emission with the characteristic collimated properties of a laser. Sajeev describes this effect in connection with randomly distributed spheres such that the incident light was not confined to a plane, but rather was scattered in all directions.

Figure 5:
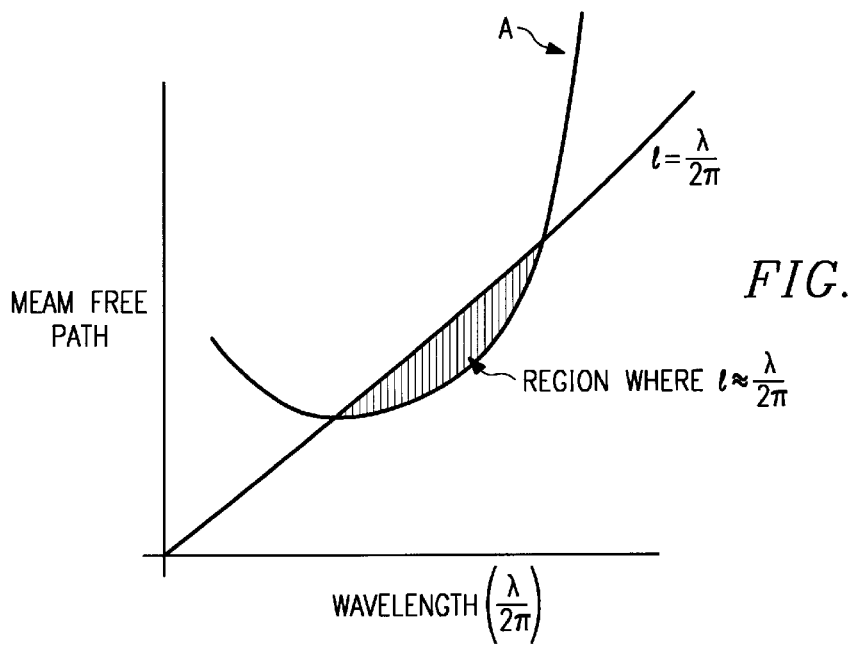
FIG. 5 illustrates a proposed explanation of the plane projection phenomenon achieved by the invention as a technical manifestation of a process known as localization of light, where the graph represents the conditions for the quasi bound states of photons in a periodic medium.

FIG. 5 illustrates a proposed explanation of the plane projection phenomenon achieved by the invention as a technical manifestation of the localization of light phenomenon. This graph is from Sajeev, and represents the conditions for the quasi bound states of photons in a periodic medium. Optical media is characterized by a distribution of dielectric objects of a given index of refraction immersed in a general background of a second dielectric substance of different index of refraction. Photons propagating in this media will generally exhibit a certain mean free path (curve A) before refractive scatter which increases at short wavelengths. The theoretical condition for localization of light is that the classical transport mean free path must equal approximately $\lambda/2p$ where $\lambda$ is the wavelength of light (shaded region of FIG. 5). This condition translates to having a wavelength of light of the order of the characteristic dimension of the spacings of objects in the media.

1.3. Exemplary Projection System

FIG. 6 illustrates the exemplary embodiment of a laser plane projection system according to the invention. In this exemplary embodiment, the laser beam 4 initially transmits parallel to the long axis of the fiber optic bundle 6.

Incidence optics 22, such as a fixed mirror, directs the laser beam 4 to the fiber bundle with substantially perpendicular incidence. The subtense of the incidence optics is reduced to minimize the blocking of the projected laser reference plane.

The projected light plane 8 is made substantially parallel to a level reference plane by leveling mounting platform 25 with adjustment screws 27, using a bubble level or similar device 28 to calibrate to level.

2. Alternative Implementations

Figure 7:
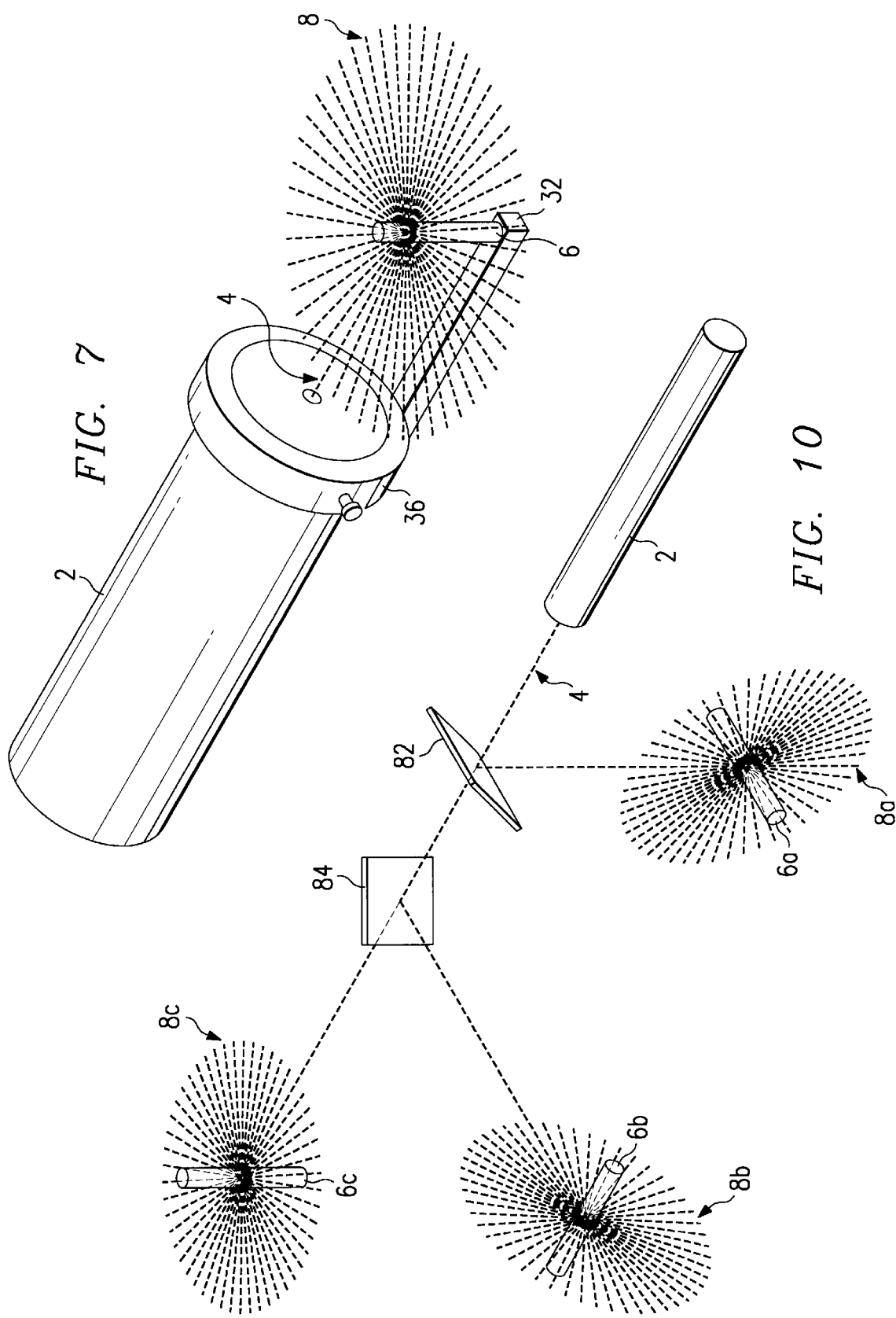
FIG. 7 illustrates an alternative implementation of a laser plane projection system, with the laser beam being aligned orthogonal to the fiber-optic bundle in the laser plane.

FIG. 7 illustrates an alternative implementation of a laser plane projection system according to the invention, with the laser beam being aligned orthogonal to the fiber-optic bundle in the laser reference plane.

This alternative implementation uses a simple mechanical fixturing to minimize part count and increase durability. The laser 2 is positioned to transmit the laser beam 4 substantially orthogonal to the fiber-optic bundle 6, which is fixed to a mounting arm 32 attached to a mounting collar 36, which is secured to laser 2. The fiber optic mounting assembly (mounting arm 32 and mounting collar 36) is constructed such that the axis of the fiber optic bundle is aligned perpendicular to the laser beam 4.

Figure 8:
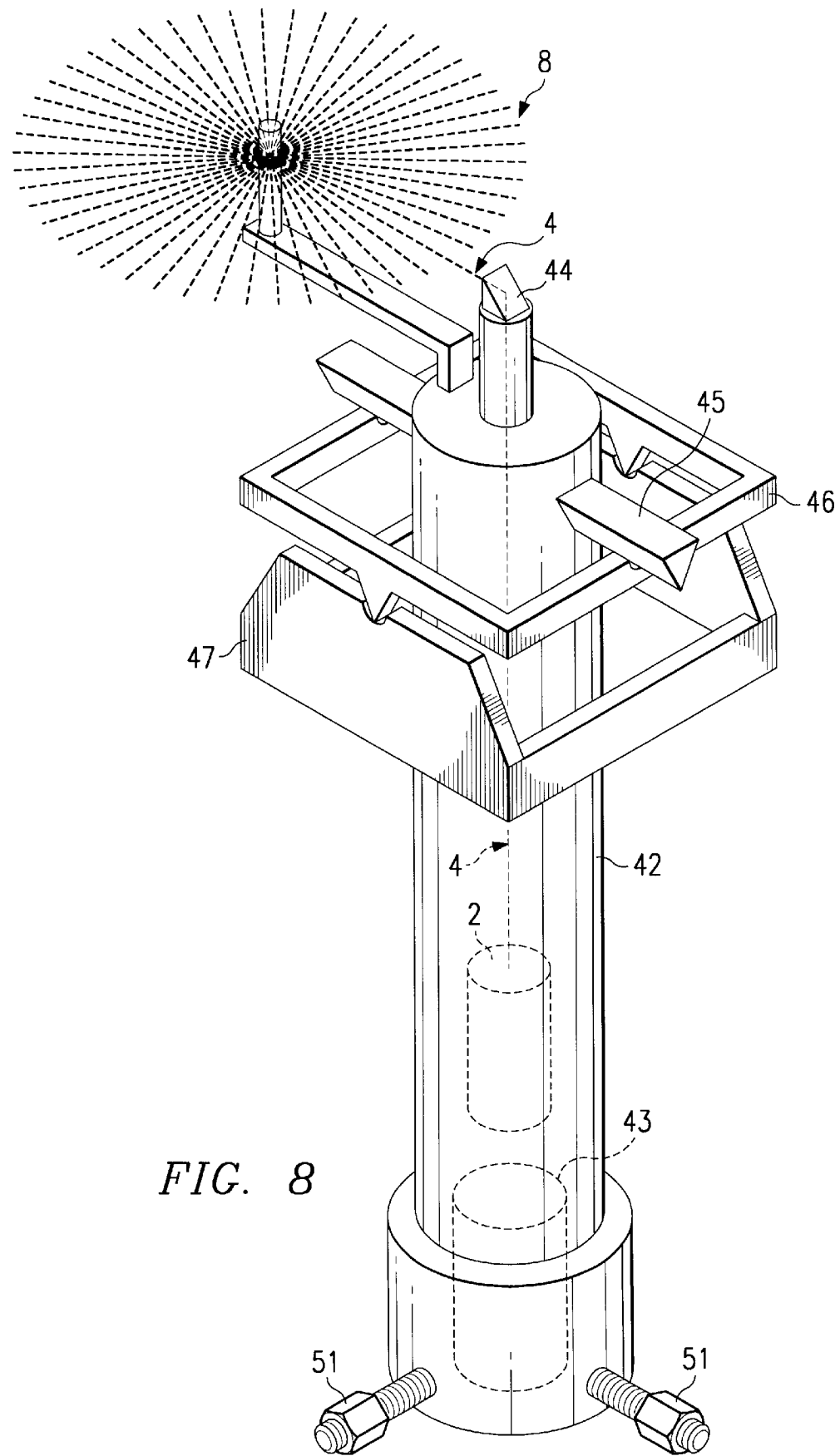
FIG. 8 illustrates an alternative implementation of a laser plane projection system, including a gimbaled support to achieve automatic leveling of the laser plane.

FIG. 8 illustrates an alternative implementation of a laser plane projection system according to the invention, including a gimbaled support to achieve automatic leveling.

The laser 2 is disposed inside a housing 42, powered by a battery unit 43. The laser beam is directed to the fiber bundle 6 by incidence optics 44. The laser housing has pivot blades 45 which permit the housing to swing in one plane about the axis through the pivot blades, balanced on a pivoted yoke 46. The pivoted yoke 46 in turn pivots on fixed yoke 47. The pivoting of yoke 46 allows the assembly to seek balance in an orthogonal plane. The projected laser plane 8 can be made parallel to a level plane through the use of weights 51 and 52 adjustably mounted on calibration screws. Once the plane is set parallel to level, the entire unit can be moved about and the system would automatically seek level, the resulting light plane being referenced to level.

Figures 9, 11:
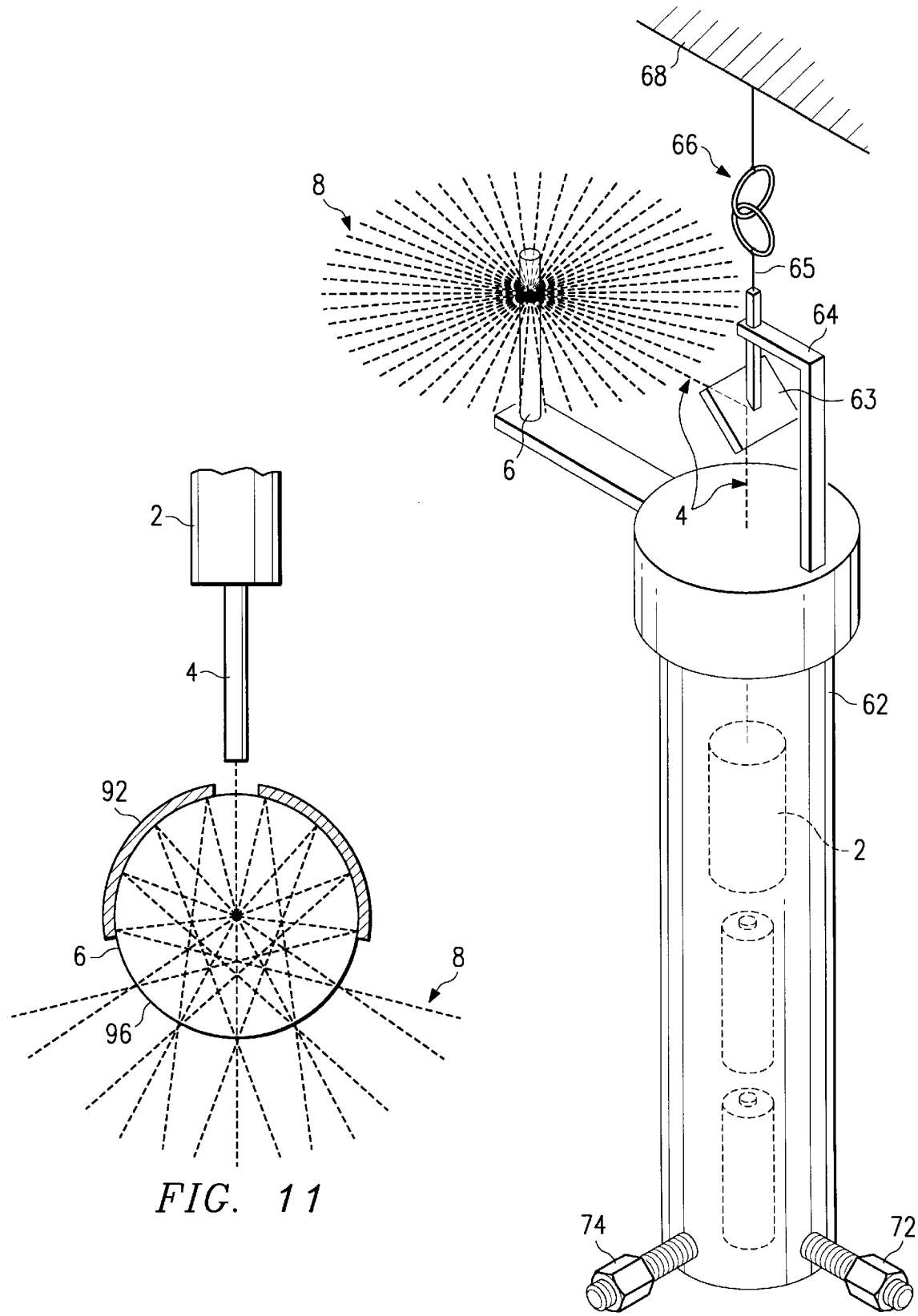
FIG. 9 illustrates an alternative implementation of a laser plane projection system, including a thin-fiber suspension system that creates precision level reference.
FIG. 11 illustrates an alternative implementation of the laser plane projection system in which the fiber optic bundle is partially coated with a reflecting material so as to enhance the light intensity or limit the plane generated to less than 360 degrees.

FIG. 9 illustrates an alternative implementation of a laser plane projection system according to the invention, including a thin-fiber suspension system that creates precision level reference.

Laser 2 is disposed in a housing 62—incidence optics 63, such as a mirror, directs the laser beam 4 to the fiber-optic bundle 6. The incidence optics is fixed to a rigidly attached over frame 64—the incidence optics is also attached by a flexible fiber 65 through an interlocking ring pair 66 to a support structure 68. Because the entire assembly is suspended as a pendulum, the unit can be adjusted to make the projected laser plane 8 parallel to a level plane by adjusting properly placed counter weights 72 and 74. The entire assembly can be moved about from the support structure while maintaining the laser plane parallel to a level plane.

FIG. 10 illustrates an alternative implementation of a laser plane projection system according to the invention, in which three mutually orthogonal planes of reference light are generated.

Two sequentially placed beam splitters 82 and 84 are used to direct laser beam 4 to three mutually orthogonally arranged fiber-optic bundles 6a, 6b, and 6c. Beam splitter 82 directs about 33% of the incident beam to fiber optic bundle 6a which projects light plane 8a. Similarly, beam splitter 84 directs 33% of the incident beam to fiber-optic bundle 6b to project a light plane 8bs. The portion of the beam 4 that transmits through both of the beam splitters is incident on fiber-optic bundle 6c to project light plane 8c. By properly adjusting the orientation of the beam splitters 82 and 84, and the orientation of the fiber bundles, the resulting light planes can be made mutually orthogonal. The entire assembly is rigidly constructed such that the optical components maintain their respective positions and orientations. Thus the assembly can be placed in the corner of a room and the two walls and the ceiling can simultaneously be precisely referenced for the purpose of setting ceiling tile, fixtures, brick laying, etc.

FIG. 11 illustrates an alternative implementation of the laser plane projection system in which the fiber optic bundle is partially coated with a reflecting material so as to enhance the light intensity or limit the plane generated to less than 360 degrees.

Laser beam 4 is incident on fiber optic bundle 6, at a substantially orthogonal angle of incidence. The fiber optic bundle is partially coated with a reflecting material 92 (such as vapor deposited aluminum) leaving an aperture 94 and a projection opening 96. The incident laser beam passes through aperture 94, and is projected radially outward from the fiber optic bundle—projected radiation incident to the coating 92 is reflected back through the projection opening, increasing the intensity of the projected laser light.

3. Conclusion

Although the Detailed Description of the invention has been directed to certain exemplary embodiments, various modifications of these embodiments, as well as alternative embodiments, will be suggested to those skilled in the art.

The invention encompasses any modifications or alternative embodiments that fall within the scope of the claims.

We claim:

1. A sheet-of-radiation projection system that projects a substantially uniform sheet of electromagnetic radiation; comprising:
   (a) a source of a beam of electromagnetic radiation;
   (b) a bundle of substantially parallel dielectric waveguides; and
   (c) incidence optics, optically coupled to the beam source, that directs the beam to be incident to the bundle of dielectric waveguides at a predetermined angle of incidence;
   (d) such that a sheet of radiation is projected from the bundle of dielectric waveguides.

2. The sheet-of-radiation projection system of claim 1, wherein the bundle of dielectric waveguides comprises a fiber-optic bundle of waveguides.

3. The sheet-of-radiation projection system of claim 2, wherein the fiber-optic bundle is formed by fused optical fibers.

4. The sheet-of-radiation projection system of claim 2, wherein the fibers have characteristic transverse dimensions on the order of the wavelength of the radiation.

5. The sheet-of-radiation projection system of claim 1, further comprising a plurality of bundles of substantially parallel dielectric waveguides, each with associated incidence optics optically coupled to the beam source to direct at least a portion of the beam to be incident to the respective bundle of dielectric waveguides at a predetermined angle of incidence.

6. The sheet-of-radiation projection system of claim 5, wherein the plurality of bundles of substantially parallel dielectric waveguides comprises three bundles oriented mutually orthogonally, and wherein the angle of incidence for each bundle is substantially orthogonal such that three substantially planar, mutually orthogonal sheets are projected.

7. The sheet-of-radiation projection system of claim 1, wherein the angle of incidence of the radiation beam is substantially orthogonal to the major axis of the bundle of dielectric waveguides, such that the projected sheet of radiation is substantially planar and substantially orthogonal to such major axis.

8. The sheet-of-radiation projection system of claim 1, wherein the incidence optics comprises a mirror that reflects the beam from the source to the bundle of dielectric waveguides.

9. The sheet-of-radiation projection system of claim 1, wherein the beam of electromagnetic radiation comprises a microwave beam emitter.

10. The sheet-of-radiation projection system of claim 1, wherein the bundle of dielectric waveguides comprises a bundle of substantially cylindrical rod elements with radially varying dielectric constants.

11. The sheet-of-radiation projection system of claim 1, wherein the beam of collimated radiation comprises a laser beam.

12. The sheet-of-radiation projection system of claim 1, wherein the dielectric waveguides are substantially cylindrical dielectric elements having media with radially varying dielectric constant or index of refraction.

13. A method of projecting a substantially uniform sheet of electromagnetic radiation; comprising the steps:
   (a) generating a beam of electromagnetic radiation;
   (b) directing the beam to be incident to a bundle of dielectric waveguides at a predetermined angle of incidence;
   (c) such that a sheet of radiation is projected from the bundle of dielectric waveguides.

14. The method of projecting a substantially uniform sheet of electromagnetic radiation of claim 13, wherein the fiber-optic bundle is formed by fused fiber optic waveguides.

15. The method of projecting a substantially uniform sheet of electromagnetic radiation of claim 14, wherein the fibers have characteristic transverse dimensions on the order of the wavelength of the radiation.

16. The method of projecting a substantially uniform sheet of electromagnetic radiation of claim 13, wherein the step of directing the beam to be incident to a bundle of dielectric waveguides comprises the step of directing at least a portion of the beam to be incident to respective ones of a plurality of bundles of substantially parallel dielectric waveguides at respective predetermined angles of incidence.

17. The method of projecting a substantially uniform sheet of electromagnetic radiation of claim 16, wherein the plurality of bundles of substantially parallel dielectric waveguides comprises three bundles oriented mutually orthogonally, and wherein the angle of incidence for each bundle is substantially orthogonal such that three substantially planar, mutually orthogonal sheets are projected.

18. The method of projecting a substantially uniform sheet of electromagnetic radiation of claim 13, wherein the angle of incidence of the beam of electromagnetic radiation is substantially orthogonal to the major axis of said bundle of dielectric waveguides, such that the projected sheet-of-radiation is substantially planar and substantially perpendicular to said axis.

19. The method of projecting a substantially uniform sheet of electromagnetic radiation of claim 13, wherein the step of directing is accomplished by a mirror that reflects the beam to the bundle of dielectric waveguides.

20. The method of projecting a substantially uniform sheet of electromagnetic radiation of claim 13, wherein the beam of electromagnetic radiation comprises a laser beam.

21. The method of projecting a substantially uniform sheet of electromagnetic radiation of claim 13, wherein the bundle of dielectric waveguides comprises a fiber-optic bundle.

22. A laser plane projection system that projects a substantially omnidirectional planar sheet of light, comprising:
   (a) a laser beam source;
   (b) a bundle of dielectric waveguides that is substantially cylindrical; and
   (c) incidence optics, optically coupled to the laser beam source, that directs the laser light beam to be incident to said bundle at a substantially orthogonal angle of incidence;
   (d) such that a substantially planar sheet of light is projected from said bundle.

23. The laser plane projection system of claim 22, wherein the bundle of dielectric waveguides comprises a fiber-optic bundle.

24. The laser plane projection system of claim 23, wherein the fiber-optic bundle is formed by fused fibers.

25. The laser plane projection system of claim 22, further comprising a plurality of bundles of substantially parallel dielectric waveguides, each with associated incidence optics optically coupled to the laser beam source to direct at least a portion of the laser beam to be incident to the respective bundle of dielectric waveguides at a predetermined angle of incidence.

26. The laser plane projection system of claim 25, wherein the plurality of bundles of substantially parallel dielectric waveguides comprises three bundles oriented mutually orthogonally, and wherein the angle of incidence for each bundle is substantially orthogonal such that three substantially planar, mutually orthogonal sheets are projected.

27. The laser plane projection system of claim 22, wherein the incidence optics comprises a mirror that reflects the beam from the source to the bundle of dielectric waveguides.

28. The laser plane projection system of claim 23, wherein the fibers have characteristic transverse dimensions on the order of the wavelength of the radiation.

29. The laser plane projection system of claim 22, wherein the angle of incidence is substantially orthogonal to the major axis of the bundle of dielectric waveguides, such that the projected sheet-of-radiation is substantially planar and perpendicular to said axis.

* * * * *